Nov. 4, 1969 W. BUHL 3,476,396
SHAFT SEAL WITH RETURN RIFLING
Filed April 13, 1965

INVENTOR
WILHELM BUHL

BY Dicke & Craig
ATTORNEYS.

United States Patent Office 3,476,396
Patented Nov. 4, 1969

3,476,396
SHAFT SEAL WITH RETURN RIFLING
Wilhelm Buhl, Stuttgart, Wurttemberg, Germany, assignor to Daimler-Benz Aktiengesellschaft, Stuttgart-Unterturkheim, Germany
Filed Apr. 13, 1965, Ser. No. 447,748
Claims priority, application Germany, Apr. 14, 1964, D 44,147
Int. Cl. F16j 15/44, 15/54
U.S. Cl. 277—59      8 Claims

ABSTRACT OF THE DISCLOSURE

For producing the rifling at the point of penetration of the shaft in the crankcase wall, flat and blade-like lubricant-scraping webs extending at an angle to the shaft axis are provided within grooves disposed at the shaft circumference and retaining therein the webs. These webs are either exclusively under the influence of the centrifugal force thereof or additionally under the influence of springs, which seek to move or displace the webs out of their grooves against the cylindrical surface of the shaft bore within the housing.

---

The present invention has the advantage compared to the known seals provided with return rifling that wear and heat retention are considerably smaller than with those seals in which the lips of elastic seal rings rest on the rifling grooves or rifling flutes or in which the rifling grooves are formed by a twisted cord. The danger of leakage oil discharge or escape is considerably smaller with the construction according to the present invention than with those seals in which the bearing surface of the shaft is provided with spirally shaped grooves as with such prior art arrangement, a certain fit or assembly clearance has to be maintained always. Also, with the use of twisted cords of soft asbestos material, one has to expect always certain leakage losses. Furthermore, the present invention is also considerably easier to assemble than those seals in which a twisted spiral spring is used as the means producing the rifling. Such a prior art seal, above all, is not suitable for sealing places disposed close to the connecting flange of the flywheel because the spiral springs do not lend themselves to be readily placed or accommodated behind the large flange diameter wtihout being bent beyond their spring action range.

Accordingly, it is an object of the present invention to provide a simple and operationally reliable shaft seal which obviates the aforementioned shortcomings and drawbacks.

It is another object of the present invention to provide a shaft seal entailing less wear and involving less heat retention than customary heretofore with the prior art constructions.

A further object of the present invention resides in the provision of a shaft seal greatly reducing, by extremely simple means easy to realize in mass production, the danger of leakage losses.

A still further object of the present invention resides in a shaft seal capable of readily absorbing small shocks and impacts of the shaft without affecting detrimentally the sealing characteristics.

Figure 1:
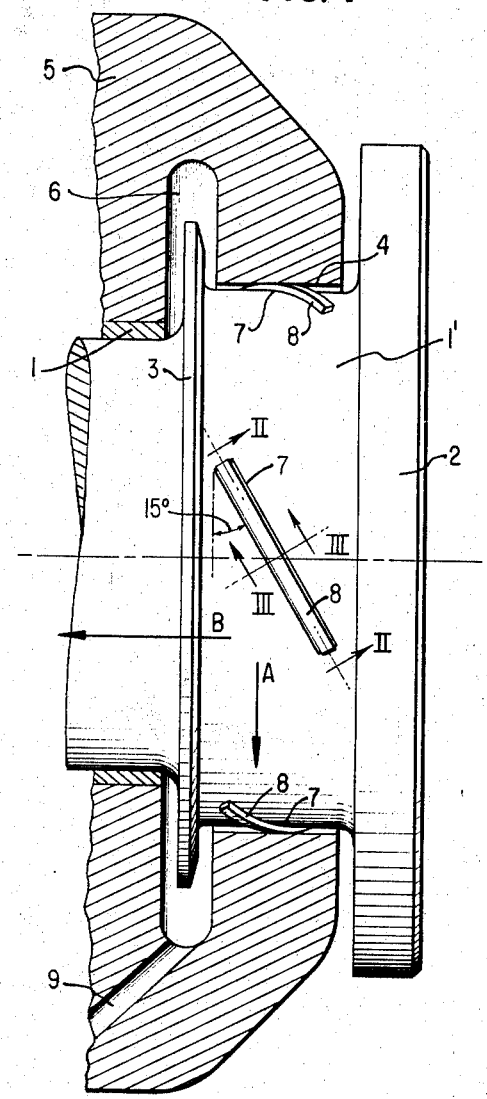
Figure 2:
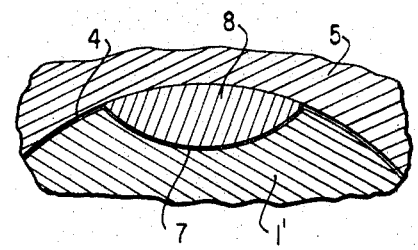
Figure 3:
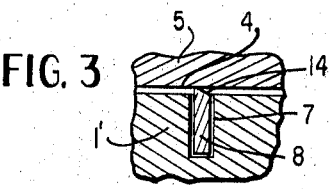
Figure 5:
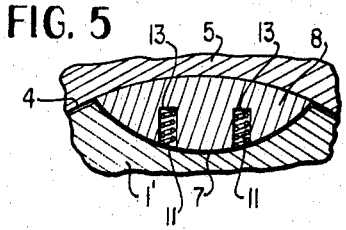
Figure 6:
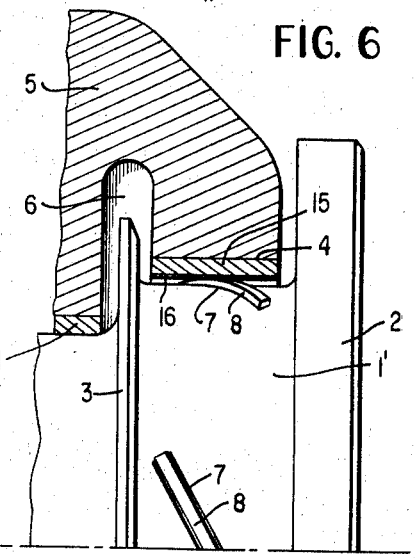
Figure 4:
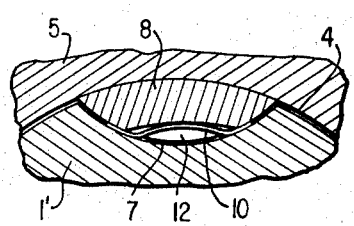

These and further objects, features, and advantages of the present invention will become more obvious from the following description when taken in connection with the accompanying drawing which shows, for purposes of illustration only, several embodiments in accordance with the present invention, and wherein:

FIGURE 1 is a partial axial cross-sectional view through a seal in accordance with the present invention and located at the flywheel end of a crankshaft, FIGURE 2 is a partial cross-sectional view through a rifling producing scraper web taken along line II—II of FIGURE 1, FIGURE 3 is a partial cross-sectional view illustrating the web according to FIGURE 2 and taken along line III—III of FIGURE 1, FIGURES 4 and 5 are partial cross-sectional views of two modified embodiments of scraper webs in accordance with the present invention resting, respectively, on leaf spring and spiral springs and taken along line II—II of FIGURE 1, and FIGURE 6 is a partial axial cross-sectional view through a modified construction of the sealing point according to the present invention, similar to FIGURE 1 and provided with an additional scraper bushing.

Referring now to the drawing wherein like reference numerals are used throughout the various views to designate like parts, and more particularly to the embodiment according to FIGURE 1, the bore 4 in the crankcase 5 through which extends the shaft and which is to be sealed, is disposed adjacent the main bearing 1 of the crankshaft between an outer flywheel coupling flange 2 and an oil-catcher slinger ring 3. Immediately behind the bore 4 is disposed an oil catcher trough or groove 6 into which extends partly the slinger ring 3.

Within the region of the bore 4, one or several disk-segment-like grooves 7 uniformly spaced over the circumference of the shaft section and inclined to the axis of the shaft are milled into the shaft section 1' of cylindrical shape thereat, into which are inserted flat, segment-like oil scraper webs 8 with such a fit that they may radially yield against small out-of-round movements of the shaft end and are able to move outwardly under the effect of the centrifugal force against the walls of the bore 4. In the illustrated embodiment, an arrangement of four scraper webs 8 is preferred which are spaced uniformly over the circumference of the shaft and which are inclined at an angle of 15° relative to the axis of the shaft. Disk springs may be used as the blanks for the manufacture of the scraper webs, the outwardly facing edges of which are curved corresponding to the diameter of the bore 4 of the crankcase. In their rest position, these edges may be made flush with the circumferential surface of the shaft or they may be made to be slightly below this surface, i.e., recessed slightly relative thereto.

The mode of operation of the scraper webs 8 is immediately apparent from FIGURE 1: It may be assumed, owing to the inclined arrangement of the scraper webs 8 shown in FIGURE 1, that the side of the shaft facing the observer, moves in the direction of arrow A. By reason of the pressure drop between the inside of the crankcase and the free atmosphere, the oil present within the housing or crankcase 5 and particularly the oil film adhering to the housing walls has the tendency to creep in the direction toward the housing bore 4 and to drip off thereat as oil loss. The major oil quantity of the oil film creeping along the crankshaft is caught by the slinger ring 3 and is thrown into the annular groove 6 from where it can drain off at 9 (FIGURE 1) downwardly into the crankcase sump (not shown). However, a certain proportion of the oil will bridge the annular groove 6 along the shaft and will travel outwardly also along the scraper surface of the housing bore 4. It is within this area that the effect of the scraper webs 8 sets in. By the effect of the centrifugal force, the outer edges of the scraper webs 8 abut against and come in contact with the inner surface of the bore 4 where they scrape off the oil film which creeps along this surface and return the same in the direction of arrow B of FIGURE 1 back into the crankcase 5.

Since this is accomplished with a considerably larger energy than the force of the creep flow, the returned oil quantity does not load and affect the sealing place 1', 4. The oil film creeping outwardly along the sealing surface 1' at the shaft is also taken along by the inner side surface of the scraper webs 8 projecting out of the grooves 7.

The surface pressure of the webs 8 on the housing bore 4 is determined by the size of the web contact surface, the occurring centrifugal force and therefore also by the weight of the web, the magnitude of the friction at the groove walls, and the rotational speed of the shaft. With larger requirements of the seal, the centrifugal force effect may also be aided by leaf springs 10 (FIGURE 4) or spiral springs 11 (FIGURE 5) inserted into the grooves underneath the scraper webs 8 (FIGURES 4 and 5). For this purpose, the scraper webs 8 are provided at the side facing the groove bottom with a milled-out recess 12 (FIGURE 4) for receiving the leaf spring 10 or with bores 13 for receiving the spiral springs 11 (FIGURE 5). The scraping effect can be improved by means of an outwardly downwardly sloping taper 14 (FIGURE 3) at the outer scraper web surfaces. The number of scraper webs used may be chosen at will within the scope of the present invention. With high rotative speeds, a single web may suffice. With low rotative speeds, several webs are provided, spaced preferably uniformly over the circumference of the shaft. In case the shaft circumferential surface 1' is insufficient at the sealing place 1', 4 for a ring-shaped arrangement of the webs, the webs may also be arranged in groups, axially staggered. Small shock movements of the shaft are absorbed without difficulty by the radially resilient webs 8. Furthermore, by the use of the present invention, a larger clearance at the sealing places 1', 4 may be provided than was previously customary. The contour of the webs 8 is not limited to the illustrated disk-spring-shape. This shape is advantageous because the webs are held fast completely satisfactorily in the circumferential direction by means of the curved groove bottom and the grooves may be cut in a simple manner with a disk milling cutter. However, grooves with a flat bottom may also be provided with the help of a finger milling cutter. In that case, the scraper webs have to assume the shape of longitudinal keys or sealing strips.

The scraper webs 8 may be of metal or also of plastic material. With high rotative speeds, it is suggested to use piston ring material. In case the bearing housing 5 is made of a material with lesser resistance to wear, for example, instead of the commonly used gray cast iron of aluminum or of a plastic material, it is proposed according to the present invention to provide the housing bore 4 with a bushing 15 (FIGURE 6) of a wear resistant material which at its inner side, passed over by the scraper webs 8, may additionally be provided with a bearing layer 16 which has good sliding characteristics.

I claim:
1. A shaft seal effective with return rifling, comprising:
   a shaft having a plurality of circumferentially spaced grooves provided in the circumferential surface of the shaft in proximity to the shaft seal and extending only partially around the circumference of the shaft at a substantial acute angle to the shaft axis, and
   a corresponding plurality of relatively flat blade-like scraper webs extending at an angle to the shaft axis and respectively inserted into said groove means.
2. A shaft seal according to claim 1, wherein said scraper web means are provided on the side thereof facing a bottom surface of a groove with recess means abutting leaf spring means in said groove means.
3. A shaft seal according to claim 1, wherein said scraper web means are provided on the side thereof facing a bottom surface of a groove with dead-end bore means accommodating coil spring means.
4. A shaft seal according to claim 1, wherein each of the webs includes flat substantially radially extending opposite side surfaces and a frusto-conical radially outermost surface joining said side surfaces.
5. A shaft seal according to claim 4, including a housing having a bore therein receiving said shaft, said bore having a bushing provided with an innermost liner with good sliding characteristics and engaging said webs during shaft rotation.
6. A shaft seal according to claim 1, including a housing having a bore therein receiving said shaft, said bore having a bushing provided with an innermost liner with good sliding characteristics and engaging said webs during shaft rotation.
7. A shaft seal according to claim 1, wherein each of said grooves includes an innermost arcuate bottom wall of a constant radius and opposite terminal longitudinal ends joining with the circumferential surface of the shaft.
8. The shaft seal according to claim 7, wherein each of said webs has a radially outermost arcuate portion complementary to the immediately adjacent circumferential surface of the shaft at the same angle with respect to the shaft axis, each of said webs further having a radially innermost surface complementary to the bottom surface of its corresponding groove.

References Cited

UNITED STATES PATENTS

| 2,751,849 | 6/1956 | Sherwood | 103—84 |
| 2,844,418 | 7/1958 | Audemar. | |
| 3,004,782 | 10/1961 | Meermans | 277—134 X |
| 3,268,983 | 8/1966 | Straub | 308—238 X |
| 3,329,472 | 7/1967 | Donnellan et al. | |

FOREIGN PATENTS 251,522  10/1912  Germany.

LAVERNE D. GEIGER, Primary Examiner

J. S. MEDNICK, Assistant Examiner

U.S. Cl. X.R.

277—67, 134, 149, 163